United States Patent
Babb et al.

(10) Patent No.: US 11,041,041 B2
(45) Date of Patent: Jun. 22, 2021

(54) HIGH RESILIENCY POLYURETHANE FOAMS MADE WITH HIGH FUNCTIONALITY, HIGH EQUIVALENT WEIGHT POLYOLS WITH MAINLY SECONDARY HYDROXYL GROUPS

(71) Applicant: Dow Global Technologies LLC, Midland, MI (US)

(72) Inventors: David A. Babb, Lake Jackson, TX (US); Jean-Paul Masy, Destelbergen (BE)

(73) Assignee: Dow Global Technologies LLC, Midland, MI (US)

( * ) Notice: Subject to any disclaimer, the term of this patent is extended or adjusted under 35 U.S.C. 154(b) by 442 days.

(21) Appl. No.: 15/763,112

(22) PCT Filed: Sep. 15, 2016

(86) PCT No.: PCT/US2016/051917
§ 371 (c)(1),
(2) Date: Mar. 25, 2018

(87) PCT Pub. No.: WO2017/062150
PCT Pub. Date: Apr. 13, 2017

(65) Prior Publication Data
US 2020/0255580 A1 Aug. 13, 2020

Related U.S. Application Data

(60) Provisional application No. 62/239,209, filed on Oct. 8, 2015.

(51) Int. Cl.
| | |
|---|---|
| *C08G 18/48* | (2006.01) |
| *C08G 18/75* | (2006.01) |
| *C08G 18/76* | (2006.01) |
| *C08G 65/26* | (2006.01) |
| *C08K 5/053* | (2006.01) |

(52) U.S. Cl.
CPC ....... *C08G 18/485* (2013.01); *C08G 18/4866* (2013.01); *C08G 18/755* (2013.01); *C08G 18/7621* (2013.01); *C08G 65/269* (2013.01); *C08G 65/2663* (2013.01); *C08G 65/2696* (2013.01); *C08K 5/053* (2013.01); *C08G 2110/0008* (2021.01); *C08G 2110/0041* (2021.01); *C08G 2110/0083* (2021.01)

(58) Field of Classification Search
CPC .............. C08G 18/485; C08G 18/4866; C08G 18/6685; C08G 18/755; C08G 18/7621; C08G 18/7671; C08G 65/2609; C08G 65/2663; C08G 65/269; C08G 65/2696; C08G 2101/0008; C08G 2101/0025; C08G 2101/0041; C08G 2101/005; C08G 2101/0083; C08K 5/053
See application file for complete search history.

(56) References Cited

U.S. PATENT DOCUMENTS

| | | | | |
|---|---|---|---|---|
| 5,605,939 A | * | 2/1997 | Hager | C08G 18/4072 521/137 |
| 5,648,559 A | | 7/1997 | Hager | |
| 5,958,994 A | | 9/1999 | Lear | |
| 2006/0293400 A1 | * | 12/2006 | Wiltz, Jr. | C08G 18/4288 521/172 |
| 2009/0306237 A1 | * | 12/2009 | Babb | C08G 18/1833 521/156 |
| 2010/0197878 A1 | * | 8/2010 | Casati | C08G 18/4816 526/319 |
| 2013/0059936 A1 | * | 3/2013 | Sasaki | C08G 65/2663 521/137 |

FOREIGN PATENT DOCUMENTS

WO     2012/134849 A     10/2012

* cited by examiner

*Primary Examiner* — John M Cooney

(57) ABSTRACT

High resiliency polyurethane foam is made from a polyether polyol having an equivalent weight of at least 1000. At least a portion of the polyether polyol is one or more random copolymer(s) formed by polymerizing a mixture of 70 to 95% by weight propylene oxide and 5 to 30% by weight ethylene oxide onto an initiator compound. The random copolymer(s) has a nominal hydroxyl functionality of at least 5, a hydroxyl equivalent weight of at least 1500 g/equivalent and no more than 0.01 milliequivalents per gram of terminal unsaturation. The randomly polymerized propylene oxide and ethylene oxide constitute at least 80% of the total weight of the random copolymer. At least 70% of the hydroxyl groups of the random copolymer are secondary hydroxyls.

9 Claims, No Drawings

HIGH RESILIENCY POLYURETHANE FOAMS MADE WITH HIGH FUNCTIONALITY, HIGH EQUIVALENT WEIGHT POLYOLS WITH MAINLY SECONDARY HYDROXYL GROUPS

This invention relates to high resiliency polyurethane foam and polyols useful for making high resiliency polyurethane foam.

Flexible polyurethane foam for cushioning applications can be classified by their surface elasticity, or resiliency. Greater resiliency is indicated by a rapid recovery from compression, with most of the energy that went into compressing the foam being returned when the compressive force is released. A highly resilient foam therefore will quickly recover its original dimensions when a compressive force is released.

Resiliency is conveniently measured by a ball rebound test such as ASTM D-3574. In this test, a steel ball is dropped onto a foam surface from a specified initial height, and the height to which it rebounds is measured. The ratio of rebound height to the initial height indicates the resiliency. A high rebound indicates a rapid recovery from the compressive force transferred to the foam sample from the dropped ball, as well as a return of a large amount of the compressive energy.

So-called "conventional" slabstock polyurethane foam is characterized by resiliency values of about 25 to 45% on the ball rebound test. By contrast, so-called "high resiliency" ("HR") foams have resiliency values of 50% to as much as 65 to 70% on the ball rebound test.

Highly resilient foams can be characterized alternatively (or in addition) by their hysteresis loss. Hysteresis loss is a measurement of how much energy that goes into compressing a foam sample is not returned when the compressive force is released, but is rather lost to thermal and mechanical dissipation forces. Foams that exhibit high resiliency performance generally have low hysteresis losses. High resiliency foams typically exhibit hysteresis losses of 30% or less. Hysteresis loss is measured, for example, by tests such as ISO 3386.

Flexible polyurethane foams are made by reacting water, a polyisocyanate and a polyether polyol in the presence of a foam-stabilizing surfactant. The water reacts with most of the polyisocyanate to produce polyurea structures and carbon dioxide. The polyurea structures are commonly referred to as the "hard segment" because they are relatively inflexible and high-melting. The hard segment imparts strength properties such as tensile and tear strength to the foam. The carbon dioxide forms a blowing gas that expands the reaction mixture as it cures. The polyether polyol becomes incorporated into the polymer structure through a reaction with some of the polyisocyanate. The resulting polyether groups in the foam structure are known as the "soft segment". They impart flexibility and therefore resiliency to the foam.

"Conventional" foams are usually made mainly with a polyether polyol having an equivalent weight of 800 to 1200. This polyol is a homopolymer of propylene oxide or a random copolymer of propylene oxide and a small amount of ethylene oxide. As such, it has mainly secondary hydroxyls.

The polyols used in "conventional" foams are not adequate for making high resiliency foam. A polyol equivalent weight of about 1700 to as much as 3000 is needed to get the higher resiliency. The higher equivalent weight of the polyol affects other aspects of the foam formulation. Because the equivalent weight is higher, less of polyisocyanate is needed to react with the polyol hydroxyl groups. As a result, less polyisocyanate is present in the foam formulations, and the "hard segment" content of high resiliency foams is generally lower than that of "conventional" foams.

Another effect of using the high equivalent weight of the polyol is that the polyol hydroxyl groups in the formulation are scarce, compared to the number of water molecules. Because of this, the water-isocyanate reaction proceeds rapidly compared to the polyol-isocyanate reaction. The poor sequencing of the reactions leads to foam collapse. To combat this, polyols for high resiliency foams are made more reactive towards isocyanate groups by manufacturing them to have mostly primary hydroxyl groups. This is done by polymerizing ethylene oxide onto the end of the polyol during the manufacturing process to form a block copolymer having internal polypropylene oxide) and terminal poly (ethylene oxide) blocks. The primary hydroxyl groups compete better with water than do the secondary hydroxyl groups of polyols for "conventional" foam, and thus permit a stable foam to be produced despite the small number of polyol hydroxyl groups and relatively low hard segment content.

The block copolymer structure of these polyols also has a surfactancy effect, which is believed to help compatibilize the various ingredients of the foam formulation and to help stabilize the foaming reaction mixture until it cures.

Almost all polyols for conventional foams are made industrially by polymerizing propylene oxide or a propylene oxide/ethylene oxide mixture using either a potassium hydroxide catalyst or a so-called double metal cyanide (DMC) catalyst. There are significant manufacturing advantages in using the DMC catalysts, because DMC catalyst residues that remain in the polyol after the polymerization reaction do not need to be removed. When KOH is used as the polymerization catalyst, it is necessary to neutralize the product to convert the $O^-K^+$ end groups to hydroxyl groups, and then to remove the catalyst residues to very low levels. This adds processing steps and increases production cost.

Polyols for high resiliency foams are made almost exclusively using potassium hydroxide as the polymerization catalyst, despite the potential advantages of using DMC catalysts. There are two main reasons for this. First, DMC catalysts are unable to catalyze the ethylene oxide polymerization reaction needed to produce polyols with high primary hydroxyl contents. Therefore, at least the ethylene oxide capping step must be performed using KOH as the catalyst. The costs of neutralization and removal of the catalyst residues therefore are incurred, which defeats a major advantage of using the DMC catalyst in the first place. In view of this, it is less expensive industrially to perform the entire polymerization using the KOH catalyst. Second, DMC catalysts produce a very small but significant high molecular weight fraction when used to polymerize propylene oxide and ethylene oxide. This high molecular weight fraction is a powerful defoamer, which works in opposition to the foam-stabilizing surfactant present in the foam formulation. This high molecular weight fraction can be tolerated when conventional foams are made, because the formulations are more stable during the foaming process. However, the high molecular weight fraction causes great difficulty in high resiliency foam formulations, which are already difficult to stabilize.

This invention is in one aspect a method for making a polyurethane foam having a resiliency of at least 50% on the ASTM 3574 ball rebound test and/or a hysteresis loss of no greater than 30% according to ISO 3386, a foam density of 24 to 80 kg/m³ and a hard segment content of 22 to 40% by weight, comprising reacting, in one or more steps and in the presence of at least one foam-stabilizing surfactant and at least one catalyst for the reaction of an alcohol group with an isocyanate group, polyurethane-forming reactants comprising one or more polyol(s) having a hydroxyl equivalent weight of at least 1000 grams per equivalent, at least one crosslinker, at least one polyisocyanate and water, wherein (I) the polyol(s) having a hydroxyl equivalent weight of at least 1000 constitute at least 55% by weight of the polyurethane-forming reactants, and (II) at least 20% by weight of said polyol(s) having a hydroxyl equivalent weight of at least 1000 is one or more random copolymer(s) formed by polymerizing a mixture of 70 to 95% by weight propylene oxide and 5 to 30% by weight ethylene oxide onto an initiator compound, the random copolymer(s) having a nominal hydroxyl functionality of at least 5, a hydroxyl equivalent weight of at least 1500 g/equivalent, no more than 0.01 milliequivalents per gram of terminal unsaturation, wherein the randomly polymerized propylene oxide and ethylene oxide constitute at least 80% of the total weight of the random copolymer and further wherein at least 70% of the hydroxyl groups of the random copolymer(s) are secondary hydroxyls.

The invention is also a random copolymer formed by polymerizing a mixture of 70 to 95% by weight propylene oxide and 5 to 30% by weight ethylene oxide onto an initiator compound, the random copolymer(s) having a nominal hydroxyl functionality of at least 5, a hydroxyl equivalent weight of at least 1500 grams/equivalent, no more than 0.01 milliequivalent of terminal unsaturation per gram, wherein the randomly polymerized propylene oxide and ethylene oxide constitute at least 80% of the total weight of the random copolymer and further wherein at least 70% of the hydroxyl groups of the random copolymer(s) are secondary hydroxyls.

Surprisingly, the foaming process proceeds well despite the inclusion of a significant quantity of polyol terminated mainly in secondary hydroxyl groups. The foam formulation is not prone to collapse, which is also unexpected because the polyol of the invention does not have a block structure and is not believed to play a significant role in compatibilizing the reactants or stabilizing the foaming reaction mixture as it cures.

Another advantage is that the polyol of the invention is easily made using double metal cyanide catalysts, and the benefits of using DMC catalyst technology, including low polyol manufacturing costs, can be realized in the manufacture of polyols for high resiliency foam.

The random copolymer contains randomly distributed propylene oxide and ethylene oxide units, where propylene oxide units have the structure —$CH_2$—$CH(CH_3)$—O— and the ethylene oxide units have the structure —$CH_2$—$CH_2$—O—. The randomly polymerized propylene oxide and ethylene oxide should constitute at least 80 weight-%, preferably at least 85 weight-% of all the polymerized alkylene oxides in the random copolymer, and may constitute up to 100 weight-% or up to 95 weight-% thereof. The randomly polymerized propylene oxide and ethylene oxide should constitute at least 75%, preferably at least 80% and more preferably at least 85% by weight of the random copolymer, and may constitute as much as 99.5% by weight thereof. The random copolymer may contain internal blocks of homopolymerized propylene oxide that constitute, if present, from 1 to 20% or 5 to 20% of the total weight of polymerized alkylene oxides. The internal blocks may be formed, for example, by homopolymerizing in one or more steps, from 0.5 to 5 moles, preferably 1 to 4 moles, of propylene oxide per hydroxyl equivalent of the initiator prior to performing the random polymerization. This hompolymerization may occur at least in part during the activation of a double metal cyanide catalyst.

The propylene oxide and ethylene oxide units are formed by polymerizing 1,2-propylene oxide and ethylene oxide, respectively. For purposes of this invention, the distribution of propylene oxide and ethylene oxide units is considered to be random when the copolymer is produced by forming a mixture of propylene oxide and ethylene oxide and polymerizing the mixture so that polymerization of propylene oxide and ethylene oxide occurs simultaneously. The random copolymer is formed by copolymerizing a mixture of 75 to 95 weight-% propylene oxide and correspondingly 5 to 25 weight-% ethylene oxide. In some embodiments, it is a random copolymer of a mixture of 75 to 90 weight-% propylene oxide and correspondingly 10 to 25 weight-% ethylene oxide.

The hydroxyl equivalent weight of the random copolymer may be at least 1750, at least 1900 or at least 2000 and in some embodiments may be up to 3000, up to 2500 or up to 2300.

At least 75% of the hydroxyl groups of the random copolymer are secondary hydroxyl groups. At least 80% or at least 85% of the hydroxyl groups may be secondary. In some embodiments, up to 100%, up to 95% or up to 93% of the hydroxyl groups are secondary hydroxyl groups.

The random copolymer preferably has a nominal hydroxyl functionality of at least 5. The nominal functionality in some embodiments is 6 to 12 and in other embodiments 6 to 8. "Nominal" functionality refers to the average number of oxyalkylatable groups per molecule of initiator compound(s) used to manufacture the random copolymer.

As is well known, the actual functionality of a polyether polyol (i.e., the actual average number of hydroxyl groups per molecule) is lower than the nominal functionality due to certain side reactions that occur during the polymerization process. When propylene oxide is polymerized, the predominant side reaction that affects functionality is an isomerization of propylene oxide to propenyl alcohol or allyl alcohol. The propenyl alcohol or allyl alcohol then functions as a monofunctional initiator onto which propylene oxide and ethylene oxide can polymerize, to form monofunctional species whose presence reduces the average functionality of the product. Because these monofunctional species have a terminal propenyl or allyl group, which is unsaturated, the amount of allylic and propenyl unsaturation in the product can be measured as an indication of the amount of monofunctional species. The random copolymer of the invention has no more than 0.01 milliequivalents of unsaturation per gram of copolymer. The amount of terminal unsaturation may be up to 0.007 meq/g.

The actual functionality of the random copolymer preferably is at least 4.5 and more preferably is at least 4.7. Actual functionality can be determined by measuring equivalent weight using titration methods to determine equivalent weight, measuring number average molecular weight using GPC methods and dividing the equivalent weight by the number average molecular weight.

The random copolymer is prepared by polymerizing a mixture of 1,2-propylene oxide and ethylene oxide in the presence of an initiator compound and a polymerization catalyst. The initiator compound includes a compound having at least 5 oxyalkylatable groups, or a mixture of two or more such compounds. The hydroxyl equivalent weight of the initiator may be, for example, up to 250, up to 200 or up to 175. The oxyalkylatable groups are preferably aliphatic hydroxyl groups. Examples of useful initiators include glucose, sorbitol, mannitol and sucrose, and alkoxylates of these formed by polymerizing up to 5 moles of propylene oxide or ethylene oxide per hydroxyl equivalent onto any of these compounds prior to performing the random polymerization.

A highly preferred polymerization catalyst is a double metal cyanide (DMC) catalyst. Suitable double metal cyanide catalysts include, for example, zinc hexacyanocobaltate catalyst complexes such as those described, for example, in U.S. Pat. Nos. 3,278,457, 3,278,458, 3,278,459, 3,404,109, 3,427,256, 3,427,334, 3,427,335 and 5,470,813. DMC catalysis provides the benefits of producing low unsaturation copolymers and low manufacturing costs. If desired, a DMC-catalyzed polymerization can be performed in the presence of an MG3-15LA compound as described in WO 2012/091968.

Another useful polymerization catalyst is cesium hydroxide.

The polymerization is performed at an elevated temperature. The polymerization temperature is typically at least 80° C. up to about 180° C. A preferred temperature is 110° C. to 180° C. or 120° C. to 180° C. The polymerization reaction usually is performed at superatmospheric pressures, but can be performed at atmospheric pressure or even subatmospheric pressures.

In this invention, the random copolymer is used as a starting material in a process for making high resiliency polyurethane foam. The process is generally characterized by reacting polyurethane-forming reactants in the presence of a surfactant and catalyst. "Polyurethane-forming reactants" are all isocyanate compounds and all other compounds that react with isocyanate compounds in the curing step to form part of the resulting polymer (including any non-emissive catalyst as described below). The polyurethane-forming reactants include one or more polyol(s) having a hydroxyl equivalent weight of at least 1000 g/equivalent, at least one crosslinker, at least one polyisocyanate and water. The polyol(s) having a hydroxyl equivalent weight of at least 1000 constitute at least 55% by weight of the polyurethane-forming reactants, and the random copolymer of the invention constitutes at 20% by weight of said polyol(s) having a hydroxyl equivalent weight of at least 1000.

The random copolymer of the invention, or a mixture of two or more such polyols, may constitute at least 30%, at least 40%, at least 50% or at least 60% by weight of the polyol(s) having a hydroxyl equivalent weight of at least 1000. The random copolymer or mixture thereof may constitute up to 100%, up to 95%, up to 90%, up to 80%, up to 75%, up to 70% or up to 65% by weight thereof.

One or more additional polyols having a hydroxyl equivalent weight of at least 1000 (i.e., one or more polyols having a hydroxyl equivalent weight of at least 1000 but which are different than the random copolymer of the invention) may be included in the polyurethane-forming reactants. Such additional polyols may have hydroxyl equivalent weights of 1000 to 5000, preferably 1000 to 3000. Such additional polyols may be, for example, one or more polyether polyols, polyester polyols, hydroxyl-terminated polybutadiene polymers, hydroxyl-terminated acrylate polymers, and the like. Specific examples of such polyols include, for example:

a) Homopolymers of ethylene oxide or a copolymer of a mixture of at least 50% by weight ethylene oxide and up to 50% by weight 1,2-propylene oxide. Such polyols preferably have a number average molecular weight of 3000 to 12000, and an average nominal functionality of 2 to 8, preferably 2 to 4. If present, such polyols preferably constitute 0.5 to 3 percent of the total weight of the polyols having a hydroxyl equivalent weight of at least 1000. Polyols of this type are often included in flexible polyurethane foam formulations to help produce an open-celled foam; and b) One or more polymers of at least 70% by weight 1,2-propylene oxide and up to 30% by weight ethylene oxide, in which at least 50%, preferably at least 70% of the hydroxyl groups are primary. Polyols of this type may have number average molecular weights of 3000 to 8000, preferably 4500 to 6000, and may have average nominal functionalities of 2 to 6, preferably 3 to 5, and actual functionalities of 1.5 to 4. Such polyol(s) may contain greater than 0.010 milliequivalents of terminal unsaturation and may be produced using a potassium hydroxide polymerization catalyst. If present, one or more polyols of this type may constitute up to 80%, up to 75%, up to 60% or up to 50% of the total weight of polyols having an equivalent weight of at least 1000. In some embodiments, such polyols constitute at least 10%, at least 25% or at least 40% of the total weight of polyols having an equivalent weight of at least 1000.

Any of the polyols having an equivalent weight of at least 1000 may contain dispersed polymer particles. The dispersed polymer particles may be, for example, polyurethane, polyurethane-urea, polyhydrazide, polyurea, polystyrene, and/or styrene-acrylonitrile particles. The weight of any such dispersed polymer particles is disregarded for purposes of calculating the equivalent weight of such a polymer dispersion.

The polyurethane-forming reactants include at least one crosslinker, by which it is meant one or more compounds having at least three hydroxyl groups and/or amine hydrogen atoms, and an equivalent weight per total number of amine hydrogens plus hydroxyl groups of up to 150, preferably up to 100 and more preferably up to 75. Examples of crosslinkers include trimethylolpropane, trimethylolethane, glycerine, erythritol, pentaerythritol, triethanolamine, diethanolamine, monoethanol amine, other aminoalcohols having an equivalent weight of up 150, ethylene diamine, diethylene triamine, triethylene pentamine, isophorone diamine, cyclohexane diamine, other aliphatic diamines having an equivalent weight of up to 150, phenylene diamine, diethyltoluenediamine, and other aromatic diamines having an equivalent weight of up to 150. The crosslinker is generally present in small amounts, such as from 0.1 to 5 parts, preferably 0.2 to 1 parts by weight, per 100 parts by weight of the polyol(s) having an equivalent weight of at least 1000.

Water is preferably present in an amount of 1 to 5, preferably 1.2 to 4, and more preferably 1.5 to 3.5 parts per 100 parts by weight of the polyol(s) having an equivalent weight of at least 1000.

The polyisocyanate contains an average of at least 1.8 isocyanate groups per molecule. It preferably contains up to 4 isocyanate groups per molecule. The polyisocyanate compound(s) may have, for example, an average of 2 to 4 or 2.3 to 3.5 isocyanate groups per molecule. The polyisocyanate preferably has an isocyanate equivalent weight of 80 to 250, more preferably 80 to 200 and still more preferably 80 to 150. The isocyanate groups may be aliphatic, cycloaliphatic or aromatic, but in general aromatic polyisocyanates are preferred.

Among the useful aromatic polyisocyanate compounds m-phenylene diisocyanate, toluene-2,4-diisocyanate, toluene-2,6-diisocyanate, naphthylene-1,5-diisocyanate, methoxyphenyl-2,4-diisocyanate, diphenylmethane-4,4'-diisocyanate, diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, polymethylene polyphenylisocyanate (PMDI), toluene-2,4,6-triisocyanate and 4,4'-dimethyldiphenylmethane-2,2',5,5'-tetraisocyanate. Modified aromatic polyisocyanates that contain urethane, urea, biuret, carbodiimide, uretoneimine, allophonate or other groups formed by reaction of one or more isocyanate groups are also useful. A preferred aromatic polyisocyanate is MDI or PMDI (or a mixture thereof that is commonly referred to as "polymeric MDI"), and so-called "liquid MDI" products that are mixtures of MDI and MDI derivatives that have biuret, carbodiimide, uretoneimine and/or allophonate linkages. Another preferred aromatic polyisocyanate is toluene diisocyanate (TDI), in particular a mixture of 60 to 90% of the 2,4-isomer and correspondingly 10 to 40% of the 2,6-isomer.

Examples of aliphatic and cycloaliphatic polyisocyanates include cyclohexane diisocyanate, 1,3- and/or 1,4-bis(isocyanatomethyl)cyclohexane, 1-methyl-cyclohexane-2,4-diisocyanate, 1-methyl-cyclohexane-2,6-diisocyanate, methylene dicyclohexane diisocyanate, isophorone diisocyanate and hexamethylene diisocyanate.

The amount of polyisocyanate is selected in conjunction with the amounts of other ingredients such that the foam has a hard segment content of 2 to 40% by weight. For purposes of this invention, the hard segment content of the foam is calculated on the basis of the weights of the polyurethane-forming reactants as follows:

$$HS\ \% = \frac{wt_{iso} + wt_{lmw}}{wt_{tot}} \times 100\%$$

wherein HS % is the weight percent of hard segment, $wt_{iso}$ is the weight of the polyisocyanate(s), $wt_{lmw}$ is the total weight of all isocyanate-reactive components in the reaction mixture that have equivalent weights of 150 or below, including any crosslinker and any non-emissive catalyst as described below but not including the water, and $wt_{tot}$ is the total weight of all polyurethane-forming reactants except the water. A preferred hard segment content is 25 to 40% and a more preferred hard segment is 30 to 40% or 30 to 35% by weight.

In addition, the amount of polyisocyanate preferably is selected to provide an isocyanate index of 60 to 150, more preferably 70 to 130 and even more preferably 80 to 120. Isocyanate index is 100 times the ratio of isocyanate groups to isocyanate-reactive groups provided by the polyurethane-forming reactants. Water and a primary amine group each are considered as having two isocyanate-reactive groups.

In addition to the foregoing polyurethane-forming reactants, other isocyanate-reactive compounds can be included, such as chain extenders and polyols having an equivalent weight of greater than 150 up to 1000. If present, these materials preferably are present in only small amounts, such as up to 10%, more preferably up to 5%, of the weight of the polyol(s) having an equivalent weight of at least 1000.

To produce the foam, the polyurethane-forming reactants are reacted in one or more steps in the presence of at least one foam-stabilizing surfactant and at least one catalyst for the reaction of an alcohol group with an isocyanate group.

The foam-stabilizing surfactant helps stabilize the gas bubbles produced during the foaming process until the polymer has cured. A wide variety of silicone surfactants as are commonly used in making polyurethane foams can be used in making the foams with the polymer polyols or dispersions of this invention. Examples of such silicone surfactants are commercially available under the tradenames Tegostab™ (Th. Goldschmidt and Co.), Niax™ (GE OSi Silicones) and Dabco™ (Air Products and Chemicals).

Suitable catalysts include, for example, include tertiary amines, cyclic amidines, tertiary phosphines, various metal chelates, acid metal salts, strong bases, various metal alcoholates and phenolates and metal salts of organic acids. Most catalysts for the alcohol-isocyanate reaction also catalyze the reaction between water and the isocyanate groups to a greater or lesser extent. It is preferred to use one or more catalysts that effectively catalyzes both the alcohol-isocyanate and water-isocyanate reactions, or at least one catalyst that is effective for the alcohol-isocyanate reaction and at least one other catalyst that is effective for the water-isocyanate reaction.

The catalyst may be or include one or more tin catalysts such as stannic chloride, stannous chloride, stannous octoate, stannous oleate, dimethyltin dilaurate, dibutyltin dilaurate, tin ricinoleate and other tin compounds of the formula $SnR_n(OR)_{4-n}$, wherein R is alkyl or aryl and n is 0 to 18, and the like. Other useful tin catalysts include dialkyl tin mercaptides such as dioctyltinmercaptide, dibutyltinmercaptide and dibutyltin mercaptide.

Examples of other metal-containing catalysts are bismuth, cobalt and zinc salts.

Examples of tertiary amine catalysts include trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether (DMEE), triethylenediamine and dimethylalkylamines where the alkyl group contains from 4 to 18 carbon atoms. Useful amidine catalysts include 1,8-diazabicyclo[5.4.0]-undec-7-ene. The amine catalyst may be a non-emissive type that contains one or more isocyanate-reactive amino or hydroxyl groups, such as those sold by Air Products under the trade designations Dabco™ RP202, Dabco™ NE1070, Dabco™ NE1909, and the like.

In addition to the foregoing ingredients, the foam-forming reaction may be performed in the presence of one or more optional ingredients such as colorants, biocides, antioxidants, preservatives, filler particles, reinforcing fibers, flame retardants, physical blowing agents, other chemical blowing agents and the like. Any or all of these may be absent from the reaction mixture. In particular, it is preferred to use water as the sole blowing agent.

The reaction of the polyurethane-forming reactants is in general carried out by simply mixing the starting materials and allowing them to react. The reaction in most cases proceeds spontaneously even at room temperature, and in some embodiments the mixing of the isocyanate-reactive ingredients with the polyisocyanates is performed by bringing the various ingredients together at approximately room temperature, such as from 15 to 35° C., and the resulting reaction mixture is then allowed to react without additional heating. Alternatively, one or more of the various ingredients can be preheated to a temperature of, for example, 36 to 80° C. before being combined with the other ingredients to produce the foam. In other embodiments, the reaction mixture is heated to a temperature of, for example, 36 to 80° C., after it is formed to help drive the cure. In still other embodiments, the reaction mixture is introduced into mold that is preheated to a temperature of 36 to 80° C. and allowed to cure in the mold without further application of heat.

Foam can be prepared in a free-rise (slabstock) process or a molding process. In a free-rise process, the reaction mixture is introduced into an open container and allowed to expand in at least the vertical direction under no restraint or only minimal restraint (such as the weight of a polymeric film). In an industrial slabstock foam process, the reaction mixture is formed continuously by bringing the various ingredients individually or in two or more subcombinations to a mixing head, where they are continuously mixed and dispensed into a trough in which the reaction mixture expands and cures.

In a molding process, the various ingredients or various subcombinations thereof are mixed and introduced into a mold, and cured in the closed mold. The amount of reaction mixture introduced into the mold is such that upon expansion and curing, the mold is filled and the density of the foam produced is 24 to 80 kg/m³. The mold may be preheated to avoid heat sink effects. In a so-called "cold-molding" process, the mold is optionally preheated to 36 to 80° C., preferably 40 to 60° C., and curing takes place in the mold without further heating of the mold. In a hot-molding process, the mold may or may not be preheated, and after the reaction mixture is introduced, the mold is externally heated (such as in an oven) to 36° to 80° C., preferably 50 to 80° C., until the reaction mixture cures at least enough to form a stable foam that can be demolded without permanent damage.

The resulting foam is characterized by having a resiliency of at least 50% on the ASTM D3574 ball rebound test, and/or a hysteresis loss of 30% or less as measured according to ISO 3386, and in addition has a foam density of 24 to 80 kg/m³. The resiliency may be, for example at least 60% on the ball rebound test, and/or the hysteresis loss may be no greater than 25%. Slabstock foams of the invention more commonly have foam densities of 24 to 60 kg/m³, whereas molded foams of the invention more commonly have foam densities of 40 to 80 kg/m³ or 40 to 60 kg/m³. Foam densities are core foam densities measured according to ISO 854.

The high resiliency foam is useful in various cushioning applications, such as in mattresses, seating, pillows, packaging applications, and the like.

The following examples are provided to illustrate the invention but are not intended to limit the scope thereof. All parts and percentages are by weight unless otherwise indicated.

In the following examples:

Polyol A is a 5000 molecular weight, nominally trifunctional copolymer of a major amount of ethylene oxide and a minor amount of 1,2-propylene oxide.

Polyol B is an approximately 5500 molecular weight block copolymer of propylene oxide and ethylene oxide. It has a nominal functionality of 4.7 and an actual functionality below 4. It contains at least 80% primary hydroxyl groups.

Polyol C is a 5700 molecular weight, nominally trifunctional block copolymer of propylene oxide and ethylene oxide. It contains at least 80% primary hydroxyl groups.

Polyol D is a 1900 equivalent weight, nominally hexafunctional polyol made by sequentially adding PO and ethylene oxide to a sorbitol initiator. The polymerized ethylene oxide constitutes 16% of the weight of Polyol D. Polyol D is made using a potassium hydroxide oxide polymerization catalyst and contains greater than 0.02 meq/g of monofunctional impurities.

DEOA is diethanolamine, a crosslinker.

Catalyst A is a mixture of dimethylaminoethylether and a non-fugitive amine catalyst.

Catalyst B is a mixture of a 33% solution of triethylene diamine in dipropylene glycol and a 70% solution of bis (dimethylaminoethyl) ether in dipropylene glycol.

Surfactant A is a silicone surfactant sold by Evonik under the trade designation Tegostab™ B 8715.

Surfactant B is a silicone surfactant sold by Evonic under the trade designation Tegostab™ B8783 LF2.

The MDI-based Polyisocyanate has a nominal NCO content of 30.8% by weight.

TDI is an 80/20 mixture of the 2,4- and 2,6-isomers of toluene diisocyanate.

The Sorbitol Initiator is a reaction product of sorbitol and 1,2-propylene oxide at a ratio of approximately 15 moles of propylene oxide per mole of sorbitol, or about 2.5 moles of propylene oxide per hydroxyl group of the starting sorbitol molecule. The product has a hydroxyl equivalent weight of about 173 and a molecular weight of about 1038.

EXAMPLE 1

686 g of the Sorbitol Initiator and 0.390 g of a zinc hexacyanocobaltate catalyst complex are combined in a 11.5 liter stainless steel reactor. After vacuum stripping at 130° C., the reactor is heated to 150° C. and 76 g 1,2-propylene oxide (PO) are fed into the reactor to activate the catalyst. When the catalyst has activated, as indicated by a decrease in the reactor pressure, 303 g PO are fed into the reactor at the rate of 15 g/minute. At this point, the total amount of propylene oxide added to the sorbitol (including the propylene oxide added during the formation of the Sorbitol Initiator) is approximately 21.6 moles per mole of sorbitol, or about 3.6 moles of PO per mole of sorbitol hydroxyl groups. Immediately following the propylene oxide feed, 6734 g of a blend of PO and EO containing 21.7 weight-% EO are fed into the reactor at the rate of 15 g/min. The resulting polyether polyol has a OH value 29.7 mg KOH/g, a hydroxyl equivalent weight of about 1883, a molecular weight of about 11,300, and a viscosity of 1950 cSt at 25° C. The proportion of primary hydroxyl groups is less than 50%. The terminal unsaturation is less than 0.010 meq/g of polymer. The polyol contains 1.5% by weight of residues from the sorbitol initiator, 80.2% polymerized propylene oxide and 18.3% polymerized ethylene oxide.

High resiliency foams are made from the foam formulations described in Table 1, using the MDI-based Polyisocyanate. In each case, all ingredients except the Polyisocyanate are combined into a formulated polyol. Foams are made by processing the formulated polyol and isocyanate through low-pressure foaming equipment at room temperature and dispensing the resulting reaction mixture into an open container where it rises against its own weight to form a high resiliency polyurethane foam.

TABLE 1

Foam Formulations

| Ingredient | Parts By Weight | | | |
|---|---|---|---|---|
| | Foam 1-A | Foam 1-B | Foam 1-C | Comp. A* |
| Example 1 Polyol | 63.2 | 40 | 20 | 0 |
| Polyol A | 1.5 | 1.5 | 1.5 | 1.5 |
| Polyol B | 30.2 | 30.2 | 30.2 | 30.2 |
| Polyol C | 0 | 23.2 | 43.2 | 63.2 |

TABLE 1-continued

Foam Formulations

| Ingredient | Parts By Weight | | | |
|---|---|---|---|---|
| | Foam 1-A | Foam 1-B | Foam 1-C | Comp. A* |
| DEOA | 0.3 | 0.3 | 0.3 | 0.3 |
| Water | 3.3 | 3.3 | 3.3 | 3.3 |
| Catalyst A | 1.0 | 1.0 | 1.0 | 1.0 |
| Surfactant A | 0.45 | 0.45 | 0.45 | 0.45 |
| MDI-based Polyisocyanate | 50 | 50 | 50 | 50 |

*Not an example of this invention.

Core foam density is measured according to ISO 854. Tensile strength at 25%, 40% and 65% elongation, elongation at break, modulus, tear strength and resiliency are measured according to ASTM D3574. Compression set is measured according to ISO 1856. Hysteresis loss is measured according to ISO 3386. Cream time, gel time and rise time are as defined in "Polyurethane Handbook," G. Oertel, Hanser Publishers, 2$^{nd}$ Edition, TP1180.P8P5713 (1993), p. 101. Results are as indicated in Table 2.

TABLE 2

| Property | Foam 1-A | Foam 1-B | Foam 1-C | Comp. A* |
|---|---|---|---|---|
| Cream time, s | 18 | 20 | 20 | 17 |
| Gel time, s | 103 | 100 | 136 | 90 |
| Rise time, s | N.D. | 124 | 165 | 124 |
| Foam Density, kg/m$^3$ | 56.1 | 55.5 | 55.4 | 54.2 |
| Compression set, % | 7.9 | 7.2 | 6.7 | 5.7 |
| Tensile strength, 25% elongation, kPa | 5.6 | 5.6 | 6.3 | 4.9 |
| Tensile strength, 40% elongation, kPa | 7.1 | 7.2 | 8.0 | 6.3 |
| Tensile strength, 65% elongation, kPa | 15.8 | 15.8 | 17.6 | 13.8 |
| Tensile modulus, MPa | 0.19 | 0.15 | 0.16 | 0.14 |
| Elongation at break, % | 60 | 62 | 62 | 59 |
| Sag Factor | 2.8 | 2.8 | 2.8 | 2.8 |
| Tear strength, N/mm | 0.153 | 0.152 | 0.177 | 0.176 |
| Resiliency, % | 53 | 54 | 55 | 58 |
| Hysteresis Loss | 28.6 | 25.7 | 25.4 | 21.5 |

*Not an example of this invention.

Foam Examples 1-A, 1-B and 1-C demonstrate the effect of replacing some or all of a conventional, trifunctional polyether polyol that has a high proportion of primary hydroxyl groups (Polyol C) with a nominally hexafunctional, random copolymer of propylene oxide and ethylene oxide that has a much lower proportion of primary hydroxyl groups (the Example 1 Polyol). Surprisingly, the substitution of the Example 1 Polyol for Polyol C leads to the formation of high resiliency foams having properties very similar to those of the control (Comparative Foam A). Even more surprising is that the foam formulation is stable without any change in foam stabilizing surfactant, and rises and cures without foam collapse.

EXAMPLES 2 and 3

Example 2: 666.5 g of the Sorbitol Initiator, 0.374 g of a zinc hexacyanocobaltate catalyst complex and 5.1 g of aluminum sec-butoxide are combined in a 11.5 liter stainless steel reactor. After vacuum stripping at 130° C., the reactor is heated to 150° C. and 85 g of PO are fed into the reactor to activate the catalyst. When the catalyst has activated, as indicated by a decrease in the reactor pressure, 277 g PO are fed into the reactor at the rate of 15 g/minute. At this point, the total amount of propylene oxide added to the sorbitol (including the propylene oxide added during the formation of the Sorbitol Initiator) is approximately 21.2 moles per mole of sorbitol, or about 3.5 moles of PO per mole of sorbitol hydroxyl groups. Immediately following the propylene oxide feed, 6454 g of a blend of PO and EO containing 21.7 weight-% EO are fed into the reactor at the rate of 14 g/min. The resulting polyether polyol has a OH value 29.8 mg KOH/g, a hydroxyl equivalent weight of about 1883, a molecular weight of about 11,300, and a viscosity of 2120 cSt at 25° C. Fewer than 50% of the hydroxyl groups are primary. The terminal unsaturation is less than 0.010 meq/g of polymer. The polyol contains 1.6% by weight of residues from the sorbitol initiator, 79.7% polymerized propylene oxide and 18.7% polymerized ethylene oxide.

Example 3: 704 g of the Sorbitol Initiator, 0.40 g of a zinc hexacyanocobaltate catalyst complex and 1.04 g of aluminum sec-butoxide are combined in a 11.5 liter stainless steel reactor. After vacuum stripping at 130° C., the reactor is heated at 150° C. and 76 g 1,2-propylene oxide (PO) are fed into the reactor to activate the catalyst. When the catalyst has activated, as indicated by a decrease in the reactor pressure, 303 g PO are fed into the reactor at the rate of 15 g/minute. At this point, the total amount of propylene oxide added to the sorbitol (including the propylene oxide added during the formation of the Sorbitol Initiator) is approximately 21.6 moles per mole of sorbitol, or about 3.6 moles of PO per more of sorbitol hydroxyl groups. Immediately following the propylene oxide feed, 6734 g of a blend of PO and EO containing 21.7 weight-% EO are fed into the reactor at the rate of 15 g/min. The resulting polyether polyol has a OH value 29.8 mg KOH/g, a hydroxyl equivalent weight of about 1883, a molecular weight of about 11,300, and a viscosity 1960 cSt at 25° C. Fewer than 50% of the hydroxyl groups are primary. The terminal unsaturation is less than 0.010 meq/g of polymer. The polyol contains 1.6% by weight of residues from the sorbitol initiator, 79.8% polymerized propylene oxide and 18.7% polymerized ethylene oxide.

High resiliency foams 1-D, 2 and 3 are made from the foam formulations described in Table 3, using the TDI as the polyisocyanate. In each case, all ingredients except the TDI are combined into a formulated polyol. Foams are made by processing the formulated polyol and TDI through low-pressure foaming equipment at room temperature and dispensing the resulting reaction mixture into an open container where it rises against its own weight to form a high resiliency molded polyurethane foam.

TABLE 3

Foam Formulations

| Ingredient | Parts By Weight | | | |
|---|---|---|---|---|
| | Foam 1-D | Foam 2 | Foam 3 | Comp. B* |
| Example 1 Polyol | 50 | 0 | 0 | 0 |
| Example 2 Polyol | 0 | 50 | 0 | 0 |
| Example 3 Polyol | 0 | 0 | 50 | 0 |
| Polyol A | 5 | 5 | 5 | 5 |
| Polyol D | 45 | 45 | 45 | 95 |
| Crosslinkers | 2.5 | 2.5 | 2.5 | 2.5 |
| Water | 2.73 | 2.73 | 2.73 | 2.73 |

TABLE 3-continued

Foam Formulations

| Ingredient | Parts By Weight | | | |
|---|---|---|---|---|
|  | Foam 1-D | Foam 2 | Foam 3 | Comp. B* |
| Catalyst B | 0.10 | 0.10 | 0.10 | 0.10 |
| Surfactant B | 0.40 | 0.40 | 0.40 | 0.40 |
| TDI (102 index) | 41.2 | 41.2 | 41.2 | 41.2 |

*Not an example of this invention.

Core foam density (ISO 854), compression force depression (ISO 3386), sag factor (ISO 3386), hysteresis (ISO 3386), tear strength (ISO 3067-89), resilience (ASTM D3574), compression set at 75% and 90% compression (ISO 1856) and wet compression set (BS ISO 13362) are measured on each of the foams. Results are as indicated in Table 4.

TABLE 4

| Property | Foam 1-D | Foam 2 | Foam 3 | Comp. B* |
|---|---|---|---|---|
| Foam Density, kg/m³ | 32.0 | 31.3 | 27.1 | 30.1 |
| 40% Compression Force Depression. kPa | 2.3 | 2.2 | 1.4 | 1.9 |
| SAG factor, kPa | 2.9 | 2.6 | 2.7 | 2.8 |
| Hysteresis loss, % | 22.3 | 22.9 | 21.6 | 22.7 |
| Tear strength, N/mm | 119 | 122 | 109 | 142 |
| Resiliency, % | 59 | 57 | 57 | 60 |
| Compression set, 75%, % | 5.4 | 5.7 | 5.8 | 5.6 |
| Compression set, 90%, % | 5.5 | 5.5 | 9.5 | 5.1 |
| Wet compression set. % | 6.9 | 7.2 | 13.3 | 11.2 |

*Not an example of this invention.

The data in Table 4 show the effect of replacing approximately half of a conventional sorbitol-initiated PO-EO block copolymer (Polyol D) with a sorbitol-initiated random copolymer of the invention. Surprisingly, the foam formulation is stable against collapse despite the large reduction in the amount of PO-EP block copolymer. Foams 1-D, 2 and 3 exhibit properties very similar to those of Comparative Sample B, despite the substitution of the different polyol.

EXAMPLE 4

584 g of the Sorbitol Initiator (584 g), 0.320 g of the DMC catalyst (0.320 g) and 5.5 µL of a 0.15 M solution of phosphoric acid are mixed thoroughly and added to an 8 liter Parr reactor. The reactor is purged thoroughly with nitrogen with stirring, and then heated to 130° C. with a nitrogen purge to dry the reactor contents. After the drying stage, the nitrogen purge is stopped, the reactor vent is closed, and the reactor is heated to 160° C. with constant agitation. A small amount of PO is added to the reactor to increase the reactor pressure to 20 psi (140 kPa) gauge to activate of the DMC catalyst. When the catalyst becomes activated, as indicated by a decrease in reactor pressure, 258 g of PO is added in an initial feed step at a rate to maintain the reactor pressure at or below 20 psi (140 kPa) gauge. When this initial PO feed is completed, 1197 g of EO and 4361 g of PO are cofed to the reactor. When the cofeed is complete, the reactor is again closed and the unreacted oxide in the reaction mixture is allowed to digest for 30 minutes. The reactor is then cooled to less than 50° C. and the contents of the reactor are removed. The product has a molecular weight of 10,900 by GPC. Fewer than 50% of the hydroxyl groups are primary. The terminal unsaturation is less than 0.010 meq/g of polymer.

EXAMPLE 5

Polyol Example 5 is prepared in a 500 mL pressure reactor equipped with a recirculation loop, a mechanical agitator, and an exit port. The pressure of the reactor is controlled at the exit port with a control valve under the control of a process control computer, which allows the reactor pressure to be maintained at a specified pressure set point. The outlet of the reactor flows through the pressure control valve and into a sample collection bottle where the product of the reaction is collected. The reactor contents are recirculated around the recirculation loop by means of a Micropump gear pump. The recirculation loop is equipped with a near-infrared (NIR) flow cell which is attached to an ABB NIR analyzer. The NIR analyzer monitors the hydroxyl content and concentration of unreacted oxirane in the reaction mixture. The recirculation loop is further equipped with injection points for oxirane reactants (EO and PO), the Sorbitol Initiator, and catalyst. Oxiranes and the Sorbitol Initiator are dispensed from storage cylinders into the recirculation loop via Bronkhorst M13 mass flow controllers under the control of a process control computer.

DMC catalyst is prepared as a 2% by weight suspension in dipropylene glycol n-butyl ether, and is dispensed into the recirculation loop through a Valco Instruments M50 Model dispensing pump at a rate to provide the desired steady state concentration of catalyst in the reaction mixture.

Feed ratios of all components are controlled to produce a polyol of the targeted number average molecular weight, % EO and % PO by weight. The rates of addition are controlled to result in a specified residence time in the reactor. Residence time is defined as the amount of time required to feed sufficient components by weight to the reactor to completely and precisely displace the full contents of the reactor one time.

39.4 g of the Sorbitol Initiator are placed into the reactor along with 0.37 µl of phosphoric acid (0.15M) and DMC catalyst (0.022 g). The mixture is stirred and purged with nitrogen while heating to 130° C. The reactor is maintained at 130° C. with constant stirring and nitrogen purge for 90 minutes to dry the reactor contents.

After the drying stage, the reactor is heated to 150° C. while still purging with nitrogen. When the reactor reaches 150° C. the nitrogen purge is stopped and the reactor vent is closed. PO and EO are added slowly to the reactor at a mass ratio of 3.86 grams of PO per gram of EO.

When the pressure in the reactor reaches approximately 30 psi (210 kPa) gauge, the recirculation pump is turned on and the reactor contents are recirculated through the NIR flow cell and back into the reactor. When the pressure in the reactor rises to 35 psi (245 kpa) gauge, the outlet from the reactor is opened and the pressure control valve on the reactor outlet is set to 40 psi (280 kPa) gauge. The pressure control valve maintains the reactor pressure throughout the remainder of the reactor operation.

The addition of the oxides is maintained until a total of 306 g of PO and 79 g of EO is added to the reactor, at which time the Sorbitol Initiator has advanced to a hydroxyl equivalent weight of approximately 1900. At this point a feed of the DMC catalyst slurry is begun at a rate of 8 µL per minute, corresponding to a steady state catalyst concentration of 60 ppm. Concurrently, the addition of Sorbitol Initiator is begun at a rate of 0.216 grams per minute. The rate of oxide addition is adjusted to provide an addition rate of 1.76 grams of PO and 0.46 grams of EO per minute. The temperature of the reactor is allowed to rise to 160° C. and is maintained and thereafter maintained at that temperature.

These flow rates and operating conditions produce a polyol having a hydroxyl equivalent weight of approximately 1900 that contains 18.7% EO by weight, in a continuous process running with a 3 hour residence time and a 60 ppm steady state concentration of DMC catalyst.

The concurrent addition of all components is maintained for a total of 17 hours, corresponding to more than 5 residence times in the reactor. The resulting product is analyzed and found to have a number average molecular weight of 11,200 as measured by GPC analysis. Fewer than 50% of the hydroxyl groups are primary. The terminal unsaturation is less than 0.010 meq/g of polymer.

EXAMPLE 6

1536 g of the Sorbitol Initiator and 375 mg of DMC catalyst are added to a 11.5 liter stainless steel reactor. At 150° C., 171 g of PO are fed to the reactor to activate the catalyst. After the catalyst has activated (as indicated by a drop in the reactor pressure), another 678 g of PO are gradually introduced into reactor at a flow rate of 10 g/min and a temperature of 160° C. Then, 5116 g of a mixture of 27.4% EO and 72.6% PO is fed to the reactor. This produces an intermediate product having an OH value of 69.4 mg KOH/g (corresponding to a hydroxyl equivalent weight of 808 and a molecular weight of about 4850) and a viscosity of 857 cSt at 25° C.

A portion of the intermediate product is combined with enough of the DMC catalyst to produce a slurry containing 1% by weight of the catalyst. The slurry is charged to a 90-liter continuous reactor. At 160° C., 114 g/hr of the slurry, 1.57 kg/hr of the Sorbitol Initiator, 3.35 kg/hr of ethylene oxide and 12.93 kg/hr of propylene oxide are fed simultaneously to the reactor. The resulting polyol product has an OH value of 29 mg KOH/g (corresponding to a hydroxyl equivalent weight of 1934 and a molecular weight of about 11,600) and a viscosity of 3240 cSt at 25° C. Fewer than 50% of the hydroxyl groups are primary. The terminal unsaturation is less than 0.010 meq/g of polymer.

What is claimed is:

1. A method for making a polyurethane foam having a resiliency of at least 50% on the ASTM 3574 ball rebound test and/or a hysteresis loss of no greater than 30% according to ISO 3386, a foam density of 24 to 80 kg/m$^3$ and a hard segment content of 22 to 40% by weight, comprising reacting, in one or more steps and in the presence of at least one foam-stabilizing surfactant and at least one catalyst for the reaction of an alcohol group with an isocyanate group, polyurethane-forming reactants comprising one or more polyol(s) having a hydroxyl equivalent weight of at least 1000 grams per equivalent, at least one crosslinker, at least one polyisocyanate and water, wherein (I) the polyol(s) having a hydroxyl equivalent weight of at least 1000 constitute at least 55% by weight of the polyurethane-forming reactants, and (II) 40 to 95% by weight of said polyol(s) having a hydroxyl equivalent weight of at least 1000 is one or more random copolymer(s) formed by polymerizing a mixture of 70 to 95% by weight propylene oxide and 5 to 30% by weight ethylene oxide onto an initiator compound, the random copolymer(s) having a nominal hydroxyl functionality of at least 5, a hydroxyl equivalent weight of at least 1500 g/equivalent, no more than 0.01 milliequivalents per gram of terminal unsaturation, wherein the randomly polymerized propylene oxide and ethylene oxide constitute at least 80% of the total weight of the random copolymer and further wherein at least 70% of the hydroxyl groups of the random copolymer(s) are secondary hydroxyls.

2. The method of claim 1 wherein the random copolymer has a nominal hydroxyl functionality of 6 to 8.

3. The method of claim 2 wherein the initiator compound is sorbitol.

4. The method of claim 3 wherein the random copolymer has a hydroxyl equivalent weight of 1500 to 2300 g/equivalent.

5. The method of claim 3 wherein the random copolymer contains no more than 0.007 milliequivalents per gram of terminal unsaturation.

6. The method of claim 3 wherein the random copolymer contains internal blocks of homopolymerized propylene oxide formed by homopolymerizing in one or more steps 1 to 4 moles of propylene oxide per hydroxyl equivalent of the initiator prior to performing the random polymerization.

7. The method of claim 3 wherein the foam density is 24 to 60 kg/m$^3$.

8. The method of claim 3 wherein the polyol(s) having a hydroxyl equivalent weight of at least 1000 include at least one of: a) a polymer of ethylene oxide or a mixture of at least 50% by weight ethylene oxide and up to 50% by weight 1,2-propylene oxide and b) a polymer of at least 70% by weight 1,2-propylene oxide and up to 30% by weight ethylene oxide, in which at least 50% of the hydroxyl groups are primary.

9. The method of claim 3 wherein the foam has a hard segment content of 30 to 40% by weight.

* * * * *